United States Patent
Zimmermann et al.

(10) Patent No.: US 6,950,734 B2
(45) Date of Patent: Sep. 27, 2005

(54) MOTOR VEHICLE

(75) Inventors: Martin Zimmermann, Sasbach (DE); Reinhard Berger, Bühl (DE); Alfons Wagner, Lote (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 557 days.

(21) Appl. No.: 09/973,966

(22) Filed: Oct. 8, 2001

(65) Prior Publication Data

US 2002/0055807 A1 May 9, 2002

Related U.S. Application Data

(63) Continuation of application No. 09/849,773, filed on May 4, 2001, now abandoned, which is a continuation of application No. PCT/DE99/03520, filed on Nov. 4, 1999.

(30) Foreign Application Priority Data

Nov. 9, 1998 (DE) .......................................... 198 51 440

(51) Int. Cl.$^7$ .............................................. F16D 43/22
(52) U.S. Cl. ........................... 701/54; 701/61; 701/102; 477/86; 192/3.58
(58) Field of Search ................................ 701/1, 36, 42, 701/54, 61, 102, 114; 477/86; 192/3.58

(56) References Cited

U.S. PATENT DOCUMENTS

| | | | | |
|---|---|---|---|---|
| 5,099,969 A | * | 3/1992 | Ohtake ........................ | 477/86 |
| 5,669,849 A | * | 9/1997 | Tabata et al. ............... | 477/102 |
| 5,875,679 A | * | 3/1999 | Salecker et al. ............. | 74/335 |

FOREIGN PATENT DOCUMENTS

| | | |
|---|---|---|
| DE | 29 00 955 A1 | 8/1979 |
| DE | 196 19 354 A1 | 11/1997 |
| EP | 0 814 391 B1 | 3/1999 |

* cited by examiner

Primary Examiner—Thomas G. Black
(74) Attorney, Agent, or Firm—Darby & Darby (57) ABSTRACT

In a method of operating a motor vehicle with an electronically controlled automatic clutch device, a control device and one or more data-storing devices for values of operating quantities and parameters, the values are stored in at least duplicate form in the data-storing device. The data are stored in prescribed formats and the integrity of the data is checked according to prescribed criteria, to ensure that incorrect data are not used in the operation of the vehicle.

130 Claims, 2 Drawing Sheets

MOTOR VEHICLE

This application is a continuation of application Ser. No. 09/849,773, filed May 4, 2001, now abandoned, which is a continuation of PCT/DE99/03520, filed Nov. 4, 1999.

BACKGROUND OF THE INVENTION

The invention relates to a method of increasing the functional reliability of a motor vehicle that is equipped with a data storage device, or a method of operating a motor vehicle with a data storage device, and it also relates to a motor vehicle with a data storage device.

The term "data storage device" in the sense of the present invention means a device in which data, such as operating data of the motor vehicle, can be stored at least temporarily in a manner that allows the data to be read back in a subsequent reading process. The way in which the data are stored is not limited to any specific data storage principle, but encompasses all kinds of electrical, electronic, electromagnetic, and optical data storage devices as well as data storage devices based on other principles.

Motor vehicles equipped with one or more data storage devices are known in the existing state of the art.

For example, a motor vehicle is known that has a control device as well as a data storage device. While the vehicle is in operation, various kinds of operating data are processed by the control device. Some of the data being processed remain constant during the entire operating time, and some have values that vary during the operating time. After the engine has been turned off, the data values are read into the storage device. The data storage is organized by means of storage addresses, with one data value or parameter value being stored per address. When the engine is subsequently started again, the stored data values are read back from the storage device into the control device.

When used under ideal conditions, the known motor vehicle of the foregoing description, or the known method of operating the vehicle or of handling the operating data have shown favorable results.

As a rule, however, the real-world operating conditions do not conform to the assumed ideal situation. Under real-world conditions, there is, e.g., the risk that a cell or element of the data storage device may get damaged at any given time, or that the required supply of electric power to the data storage device may be interrupted while the transfer of data into the device is in process.

With a failure of the kind just mentioned, the data cannot be retrieved from the storage device when the vehicle is started up again. In an extreme situation, the motor vehicle could be made entirely inoperable by a failure condition related to the data storage.

Also known is a motor vehicle with a data storage device, or a method of operating the vehicle, where the latter is equipped with a control device for controlling an actuator device of a clutch. In this known arrangement, a target value is set for a required amount of clutch actuator travel. Furthermore, a command signal is generated to cause an actual displacement of the clutch actuator. Preferably, the command signal corresponds to the target value or a transformed signal representative of the target value. In a situation, where the resultant actual displacement is found to stay unchanged (i.e., the displacement shows a zero time gradient), although the target value has not yet been reached, the actuator shuts itself off and/or a failure is registered.

The shut-off and/or the failure signal indicates that a specific type of malfunction is present in the system.

The known motor vehicle of the foregoing description provides on the one hand a protection against overload of the clutch actuator and on the other hand allows malfunctions in the vehicle, or more specifically in the clutch system, to be recognized.

OBJECT OF THE INVENTION

The present invention therefore has the object of providing a method of operating a motor vehicle with a control device as well as a data storage device, and also to provide the vehicle that is operable by the inventive method. The vehicle according to the invention must meet the criteria of a favorable manufacturing cost, uncomplicated construction, a high degree of data protection, and assured accuracy of the data. In addition, the method and/or vehicle according to the invention is to provide reliable operational safeguards in cases of malfunction combined with effective diagnostic capabilities.

SUMMARY OF THE INVENTION

According to the invention, the foregoing objective is realized in a method of operating a motor vehicle which is equipped in particular with an electronically controlled clutch device, specifically an automatic clutch of the kind that is commercially distributed by the assignee of the present invention, e.g., under the designation "Electronic Clutch Management". The method according to the invention has the steps of:

storing at least one parameter value, e.g., of an adaptive parameter in at least one data storage device;

storing at least one check value in at least one data storage device;

wherein the at least one check value serves to verify whether the parameter value was stored correctly, using a predetermined checking characteristic for the verification.

Thus, in a motor vehicle equipped with an electronically controlled clutch device, particularly an automatic clutch device of the type that is commercially distributed, e.g., by the assignee of the present invention under the trade designation "Electronic Clutch Management", the invention introduces the concept of storing data at predetermined times and subsequently retrieving the data from storage, using a method or device where at least a part of the stored data is backed up by check values, e.g., to increase the operational or functional reliability, to detect or avoid errors in the data used by the control device, or simply to operate the vehicle. The quantities or parameters that are secured by check values are preferably adaptive parameters.

It should be noted that within the scope of the present invention, any value that is entered into a storage device is referred to as a storage value. The terms "storage" as well as "memory" or "storage memory" generally relate to any device, arrangement or location where a value is stored, as well as to the act or process of putting the value into said device, arrangement or location. However, in the appropriate context, the term "storage" can also refer to the value itself that resides in the storage memory. The term "primary storage value" or "primary storage" can refer to a value that is stored ahead of another value representing the same quantity, and/or to the storage of a value in its original format, where the same value may at the same time be stored more than once, which may also include storages of the same value in modified formats. It should be noted that the foregoing terminology is to be applied flexibly, and not all of the meanings may apply cumulatively in a given context.

The terms "second storage", "third storage", etc., refer to the storing of copies of the same value. A second storage value is also referred to as a first redundant value or first redundancy, and analogous terminology is used for any higher-order storage of the same value.

According to the invention, the number of multiple copies stored of the same value is in principle unlimited. Particularly preferred is a triplicate storage, where a data value is stored as a primary storage value, as a first redundant value, and as a second redundant value.

It is also preferred according to the invention, if the primary storage retains the full numerical precision of the data value, while at least a part of the redundant copies of the value are stored in an abbreviated format. However, even if values are stored in abbreviated format, it is preferred to provide a possibility where the original value can be retrieved substantially with its original numerical precision.

Under another preferred embodiment of the invention, the values can be read back from the storage device with reduced precision, i.e., rounded off.

It is further preferred to use a check value in the form of a test number.

According to the invention, the check value or a given checking characteristic makes it possible to determine whether a value was stored correctly. In particular, the invention provides the possibility to determine whether a value that was transferred from a control device to a storage device of the vehicle at the end of an operating phase is retrievable essentially unchanged at the beginning of the next following operating phase.

It is also preferred if in the case of a storage failure, the check quantity or a given detection characteristic provides a means for determining the value that should have been stored.

The invention has the advantage that malfunctions in the storage device and/or in the data transfer can be immediately recognized. Thus, the invention eliminates the risk of using erroneous data. The use of a check value further provides the possibility of determining the value that actually should have been stored. The invention further includes the possibility of storing emergency back-up values to be used in cases of extreme failures, so that the vehicle always remains operable.

According to a preferred embodiment of a method according to the invention, at least a part of the data that are secured by check values consist of one or more operating parameters of the motor vehicle. Preferably, these operating parameters are adaptive parameters, i.e., parameters that change in magnitude during the operation of the vehicle. With special preference, the adaptive parameters are at least in part quantities that are optimized for the operation of the vehicle through adaption processes that are initiated in a control device.

With particular preference, a motor vehicle according to the invention has a control device that directs the data transfer between the control device and the storage device.

According to a particularly preferred embodiment of the invention, the step of storing a parameter value or a quantity in a storage device also includes reading the parameter value or quantity out of the control device.

With preference, the step of storing is started with a primary storage where the value to be stored is simply entered into the storage device. The latter is preferably an EEPROM device or includes an EEPROM device.

According to a particularly preferred embodiment of the invention, the primary storage takes place during a shut-down phase of the control device after the "ignition off" signal, followed by additional, redundant transfers of the same values into storage. Preferably, the redundant copies in storage are at least in part identical to the primary storage.

According to a particularly preferred embodiment of the invention, at least a part of the redundancies are stored in a data format that is different from the primary storage.

It should be noted that the terms "redundancy" and "redundant" as used herein refer to the fact that a primary storage or primary storage value has associated redundant values or redundancies, for short. The redundancies correspond to the same quantity or parameter as the primary storage value. According to the invention, a primary storage as well as one or more redundancies (i.e., a second, third, fourth storage, etc.) are provided for a multitude of quantities or parameters, such as operating parameters of the vehicle.

According to a particularly preferred embodiment of the invention, the primary storage and/or at least one redundant storage are in binary code format.

With particular preference the 16-bit format, e.g., in the form of a 16-bit integer or preferably a 16-bit word, is used for the primary storage and/or at least one redundant storage.

Also among the preferred embodiments, the 8-bit format (also known as byte format) is used for the primary storage and/or at least one redundant storage.

According to a particularly preferred embodiment of the invention, a value is stored in the storage device, either for a primary storage or for a redundant storage, in m bits of an n-bit address, where $m \leq n$, m and n being positive integers.

In a 16-bit-word address that is divided into two bytes, the bytes are preferably used to store one data value per byte.

As a preferred example of the last mentioned form of data storage, a first redundant copy of a given data value may be stored in the first of the two bytes, while a second redundant copy of a different value is stored in the second of the two bytes.

It is further especially preferred if a value that is represented in a first data format is shifted by one or more bit positions prior to being stored. For example, a value represented in a 16-bit word format may be shifted according to a shifting characteristic that has the form of a table or list in such a manner that the upper bits are stored in a second format such as a byte format, while the lower bits are cut off.

As an example of the foregoing concept, a quantity that can take on a value within a range between 0 and 2000 and that can accordingly be represented by a maximum of 11 bits may be shifted down by three binary positions, whereby the lowest three bits are cut off.

It should be noted, of course, that the invention also covers the possibility of cutting off the higher bits. The choice of whether to cut off the high-end bits or the low-end bits depends on the purpose that is to be accomplished. For example, if a value is to be represented where the variation includes the high-end of the bit positions, cutting off the low-end bits will not affect the relative significance of the value by very much. If on the other hand a value is to be represented which, based on its nature, does not change in the upper bits and shows variations only in the lower bit positions, it can be more advantageous to cut off (or shift out) the upper bits in order to make room for representing the lower bits exactly.

The invention is in no way limited with regard to shifting or cutting either the lower or the higher bits that make up data values.

It should be noted that the shifting or truncating of data values can lead to rounding errors (which may in some cases be intended), but that such rounding errors are not always a necessary consequence. An error occurs, for example, with a preferred embodiment of the invention where, in a subsequent reading of shifted data values, the bits that were dropped in the storing phase are set at arbitrary or predetermined values that are not the same as in the primary storage.

The invention also includes embodiments where no rounding errors occur, for example if shifted or truncated values are read from a redundant storage and the dropped bits are retrieved from the primary storage.

The latter concept has the advantage that it requires less storage memory, while the values read back from the storage device still have a high degree of numerical precision and reliability.

According to a particularly preferred embodiment, a first step in the inventive method is to determine the level of precision to be used in storing a given value. This may also include a determination of whether the relevant information is contained in the higher or lower bits of the value.

Depending on the result of the foregoing determination and also depending on the magnitude of the value, the number of bits for shifting the value is set, and the value is shifted and stored accordingly.

In accordance with a particularly preferred embodiment of the invention, values related to the neutral position of the transmission, or at least one leg of the shift pattern, at least one rest position or at least one friction-related value of the clutch are stored in triplicate, with the second and third storage value (first and second redundancy, respectively) being shifted before storing by two positions and then stored in byte format. It is also preferred to use an address in word (16-bit) format to store the bytes.

According to a particularly preferred embodiment of the invention, the value for a point of engagement is shifted by three bit positions before entering it into second and third storage.

It is also preferred to store adaptive parameters in triplicate, with the primary storage in a first word address, the second storage in a first byte of a second word address, and the third storage in a first byte of a third word address. It is particularly preferred if the second address and the third address are consecutive addresses.

According to a particularly preferred embodiment of the invention, at least some of the addresses or at least parts of the addresses are occupied by a default code prior to storing a data value, for example "FFFF" or "11111111" or "1111111111111111".

The default code serves, e.g., as an indicator that a data value was not stored correctly, in case a malfunction occurs, before, during or after entering a value into storage.

In the storing process, the default code is overwritten with the value to be stored. If the transfer of a value into storage is not executed correctly, the default code will not be overwritten, i.e., stay in place. Thus, a malfunction in storing a value can be immediately recognized.

According to a particularly preferred embodiment of the invention, the redundancies are always stored after the primary storage has been carried out.

Also in accordance with a particularly preferred embodiment of the invention, test numbers or test codes are used either in addition to or in place of storing multiple, redundant copies of the same values.

The test numbers or test codes are assigned, e.g., before, during or after storing a value. With preference, the test numbers or test codes are not full representations of the value, but only indicators of certain individual criteria.

For example, a test number may indicate how many bit positions are occupied and/or it may be the sum of the binary values set at the individual bit positions.

Also among the preferred embodiments is the concept that one test number is used to cover a plurality of different addresses.

According to another preferred embodiment of the invention, a test number is made up of the sum of the bit values at a plurality of different addresses. Also among the preferred embodiments, a plurality of test numbers or test codes can be used to secure the contents of a single address or to secure the contents of a plurality of addresses.

The preferred embodiments include saving the test numbers or test codes at an address other than the one that is being secured, as well as saving the test numbers or test codes at the same address.

Preferably, an assignment characteristic is set up for the test numbers, to define how the test numbers are related to the data values.

According to a particularly preferred embodiment, the storage device includes an EEPROM or is part of an EEPROM (Electronically Erasable Programmable Read-Only Memory). A suitable type of EEPROM has, for example, 128 words, i.e., a format of 128×16. It is also possible to use EEPROMS with 64×16 and 256×16 format. Other formats can also be used.

According to a particularly preferred embodiment of the invention the EEPROM is used to store values that vary at least in part during the operation of the vehicle, e.g., adaptive values, as well as to store values that remain constant during the operation of the vehicle.

With particular preference, an EEPROM has a portion of its capacity reserved for addresses that are used to store error data.

It is further preferred if a storage device has a location where a preset substitute value is stored for at least one adaptive quantity. A substitute value may, for example, be used as a backup if a storage error is detected and a parameter value that was entered from the control device into the storage device cannot be reconstituted even with the redundant storage data.

According to a particularly preferred embodiment of the invention, at least one portion of the data storage device is reserved to store values that can be used to check the values of the adaptive parameters or the values that are transferred between the control device and the data storage device.

As an example of test values, the data storage device may contain range limits of the values that can be assumed by the parameter data that are transferred between the storage device and the control device.

This allows values to be detected that were stored incorrectly, so that they are either too large or too small.

The invention further includes the storing of calibration values. According to a particularly preferred embodiment, the characteristic for shifting the values, such as a list or table, is stored separately. This applies in particular to a mask characteristic that is used to read back the shifted values.

According to a particularly preferred embodiment, the control device is reset from time to time. Reset times may be, for example, when the vehicle is put into one of the states "ignition on" or "wake-up".

It is also preferred, when reading back stored data values, to transform the data before, during or after the reading, i.e., to put the data into a different format. This is particularly applicable, if the same values were transformed once before, when they were entered into the data storage device. In this case, the values are preferably subjected to a kind of back-transformation, e.g., by putting values that were stored in byte format back into a word format. It is particularly preferred to bring back the cut-off bytes in accordance with a given characteristic. This characteristic can, e.g., consist of a given correlation list of values that is stored permanently.

It is further preferred if the primary storage is in word format, while the second and third storage are in byte format. In the transformation of the redundant values that are stored as bytes, the dropped bits in the redundant values can be replaced from the word format of the corresponding primary storage address.

It is preferred if bits that are reconstituted in this manner are of lesser significance than the other bits.

Preferably, the redundancies that were stored as bytes are shifted again before, during or after they are read back and/or transformed.

Preferably, the shifting at the retrieval of the data from storage is performed according to a characteristic that is substantially the reverse of the shifting characteristic used for storing the data. This means that preferably, the shift that was made when storing the data is reversed. For example, the data stored in byte format are restored to a larger format. Preferably, at least a part of the retrieved values is fitted to format masks before, during or after they are read back or transformed.

It is particularly preferred if based on the primary storage values, the dropped bits are reattached to the redundant copies of the values. According to a particularly preferred embodiment of the invention, the individual stored copies that are based on the same adaptive value or the same quantity are subsequently compared, e.g., by comparing the redundant storage values to each other, or by comparing the primary storage value to the redundant storage values. Also among the preferred concepts of the invention, at least a part of a primary storage value is compared to at least one redundant storage value, or vice versa. For example, the bits of a redundant storage value in byte format are compared (taking the shift of bit positions into account) to the corresponding bits of the primary storage of the same value which is in word format.

It should be noted that the possible ways of comparing are not limited to the foregoing examples. Those skilled in the art will know of a multitude of other possibilities of comparing data. For example the invention provides that the comparison is made before the transformation or a process similar to a transformation, but the sequence could also be reversed in another preferred embodiment of the invention.

According to a particularly preferred embodiment of the invention, a value is selected, preferably among the storage values and in accordance with a selection characteristic, as a working value or preliminary working value for at least one operating variable or for all of the operating variables.

The selected value in the selected format can be entered directly or indirectly into the y-controller or into any other controller device. It is also preferred if the selected value is modified before being entered.

For example, the selected value or preliminary working value can be a primary storage value, or a redundant storage value or a transformed redundant storage value, or a mask-fitted storage value, or another comparison value. The term "comparison value" means in particular any value used in a comparison for selecting the working value.

Preferably, a storage value or comparison value is selected according to a predetermined characteristic for use as a working value or a preliminary working value as one of at least two comparison values that deviate from each other by less than a prescribed maximum allowable deviation. Preferably, the maximum allowable deviation is of a constant value. Also among the preferred concepts, the maximum allowable deviation can be given in the form of a mathematical function or relationship that depends, e.g., on the magnitude of the storage values.

With particular preference, a value is selected as a working value or preliminary working value, if it is substantially identical with a second comparison value. In particular, a primary storage value is considered identical to a redundant storage value, if the redundant storage does not have all of the bits of the primary storage, but if the bits at the positions that they have in common are identical.

It is also preferred to select the value that occurs with the highest frequency among all storage values of the same operating variable or of the same quantity. For example, if working variables are stored in triplicate and the value in one of the three storage locations differs from the other two, the value that occurs in two of the locations is selected. If the values are identical in all three storage locations, it is preferred to select the primary storage value.

It is particularly preferred to select the primary storage value if one of the redundant storage values, e.g., the second storage, contains an error code such as "FFFF". The presence of an error code indicates, e.g., that the power supply was interrupted during at least part of the storage process. This type of error code will appear during data retrieval for example if the battery was disconnected in a storage phase that took place after turning off the engine.

It is further a preferred concept of the invention, to assign fictitious bands of a certain bandwidth to storage values that relate to the same operating variable or the same quantity. The number of bands is essentially arbitrary, but preferably limited by the number of different storages. For example, the bands may be assigned to the storage values according to the conditions that every storage value lies within a band and every band contains as many values as possible.

It is preferred to give more weight to the condition that every storage value lies within a band. This means in particular that an individual band is preferably not repositioned in order to get more storage values to lie within the band, if this would cause another value to fall outside the band. It is preferred, for example, to assign a band to each storage value and to reposition the band in relation to the storage value so that on the one hand, the storage value continues to be included in the band and on the other hand as many storage values as possible lie within the band.

It is particularly preferred to subsequently select a value from the band that contains the most values for further use in the operation of the vehicle. The selected value can be, for example, one of the storage values, or else any arbitrary value within the band or interval in which the greatest number of storage values are found.

It is further a preferred concept of the invention to select a substitute value for the continued operation of the vehicle if none of the comparison values are found to be suitable for the operation of the vehicle, or if there is an excessive level of uncertainty that the available value was stored correctly. A substitute value could be generated, or it could be stored in a table or list from which it can be retrieved. Preferably, a substitute value is stored with reference to specific operating parameters.

It is further preferred to select a substitute value if the number of disagreeing comparison values or storage values in relation to the total number of storage entries for the same value is larger than a prescribed ratio.

It is also preferred to use a substitute value as a working variable if all of the storage values for that variable are different from each other. It is particularly preferred to have three stored copies of a value, namely a primary storage and two redundant stored copies, where the substitute value is used if the primary storage is found to be different from the first or second redundant copy and at the same time the first redundant copy is different from the second redundant copy.

With particular preference, the selected substitute value is retrieved from a stored table or assignment characteristic and entered into the Y-controller or into a control unit. It is particularly preferred to choose the stored substitute values under the criterion that they allow, and preferably assure, the vehicle to be operable, and that the substitute values be matched to the control device in such a manner that the adaptations performed by the control device during the operation of the vehicle will not cause the operating variables to take on values outside a permissible range.

It is also preferred to use a substitute value only in cases where all of the storage values are different and none of them contains an error code.

Nevertheless, the scope of the invention also includes the case where a substitute value is used especially in the case where a storage value contains an error code.

It is further preferred in establishing a substitute value, if the latter is determined dependent on the magnitude of the comparison values or storage values.

As an example, a substitute value is established according to a defined characteristic, where the latter depends on the storage values or on the limits of a band that contains the maximum number of storage values, as discussed above.

It is also preferred if the substitute values are stored in an area of the storage memory that is substantially uncoupled from the memory area occupied by the primary storage values and the redundant copies. Consequently, in case of a failure in the memory area for the primary storage values and the redundant copies, the substitute value will still be available.

It is also particularly preferred if an emergency driving strategy is initiated when an error in gear-shifting thresholds has been detected. For example, an emergency driving strategy may be adopted in a case where a substitute value for the gear-shifting threshold would has been or would have to be determined. This applies, e.g., to the case where all of the comparison values are different from each other. In this case, it is preferred to set an implausible value for the gear-shifting thresholds. An implausible value in general is a value that lies outside of a range of permissible values. The choice of an implausible value for the gear-shifting thresholds is preferred if there is no other way of assuring that the malfunctions will not reach a magnitude where no substitute values can be calculated that will guarantee the safe functioning of the gear-shifting process. If the safe function of the gear shifts is assured—a case that is also included in the scope of the invention—it is also preferred to set the shifting thresholds on the basis of plausible substitute values. Under a further preferred concept of the invention, a test is performed in the retrieval of the storage values, as to whether or not the values in memory were stored correctly, based on the test number or test code.

Test numbers can be used as a supplementary measure in addition to storing multiple copies of values. In a preferred embodiment, test numbers are used in place of storing multiple copies. In the case, where a value was stored only once and at least one test code or test number was used, it is preferred to use the storage value as operating variable if the test code or test number confirms the storage value. This procedure applies analogously to the case where more than one test code or test number is used.

If test codes or test numbers are used in combination with storing multiple copies, it is further preferred to check the storage values as to whether or not, e.g., a storage of a rank i was entered into memory correctly, based on the test numbers. The rank i stands for the ordinal number assigned to a storage value, as in primary, second, third storage, etc.

If the test number or test code confirms the storage value, the latter is marked through a further procedural step as being eligible for use as an operating variable. If the check shows a discrepancy, the storage value is rejected from being used as an operating variable. It is also a preferred concept to replace rejected values by substitute values. This may be applied with only a single storage as well as with multiple stored copies of values.

It is also preferred to use substitute values if the probability that a storage value was entered correctly into memory is lower than a prescribed probability level.

The values that are transferred from the storage memory to the control device are preferably selected values in the above-defined sense, i.e., values that have passed an at least preliminary selection.

As a particularly preferred concept, a selected value is checked for plausibility either in the control device or prior to the transfer of the value into the control device. The values subjected to this test can be, e.g., primary storage values, redundant copies of values, transformed redundant copies, mask-fitted redundant copies, or other comparison values.

For example, a plausibility check may consist of or include a verification that a selected value lies within a given band of permissible values. Preferably, the band is defined by interval limits that are stored in memory and are of a magnitude which assures, in the case of adaptive parameters, that the adaptions performed by the control device during the operation of the vehicle will not cause the respective parameter value to fall out of the check interval.

It is preferred under the inventive method to use a substitute value if the selected value has been found to be implausible. For example, substitute values may be 10 mm for the point of clutch engagement, 0.27 for the friction coefficient, "0" (zero) for the vehicle code, or 90° C. for the clutch temperature.

It is also preferred if, after a value has been found implausible, another value for the same parameter is retrieved in a subsequent cycle of the program loop, with the implausible value being disregarded.

A particularly preferred embodiment of the invention includes the setting of error codes, such as error bits or error flags, if certain predetermined errors or error combinations have been detected. For example, an error bit may be set if a primary storage does not agree with all of its associated redundant storage values, or if any of the comparison values do not agree with each other. Another case for setting an error bit may be if a storage location contains an error code such as "FFFF". With particular preference, an error bit is set if all of the comparison values differ from each other, causing a substitute value to be selected. Another preferred case for setting an error bit occurs if an error is detected in a gear-shifting threshold value. An error bit may further be set, if a plausibility check shows a value to be implausible, e.g., because the value is outside of a permissible range.

Preferred embodiments of the invention further include using a corrected value for an operating parameter if an error bit or error code has been set for that operating parameter.

A further preferred concept is to make an entry in an error-storage memory in cases where certain error codes have been set.

For example, an embodiment of the invention provides that an entry is made in the error-storage memory if an error bit was set to indicate that all of the storage values or comparison values have been found to be different from each other.

As another example, an entry in the error-storage memory may be made if an error bit was set to indicate that a value was found to be implausible.

The object of the invention is further met by a method of making the operation of a motor vehicle more reliable. The increase in reliability is achieved through the following steps:

a) A displacement-versus-time function is set as a control target for the movement of an actuator of a torque-transmitting device, for example a clutch. The targeted displacement-versus-time function can be characterized by one or more target values to be met by one or more predetermined parameters of the function at one or more predetermined times.

b) A command signal is issued for the actuator to perform a movement according to the targeted displacement-versus-time function of step a). As a result, the actuator will move according to an actual displacement-versus-time function characterized by one or more actual values that the predetermined parameters assume at the predetermined times.

c) The one or more actual values are compared to the respective target values.

d) A determination is made, whether the one or more actual values deviate from the respective target values to an extent that meets a first set of characteristic error criteria.

e) If the result of step d) is affirmative, one or more first error entries are made into a storage memory for error entries, and/or the presence of at least one first malfunction is registered.

f) A further determination is made, whether the one or more actual values deviate from the corresponding target values to an extent that meets further sets of characteristic error criteria, which may be referred to by an ordinal number of $j \geq 2$, for example a second or third set of error criteria.

g) If the result of step f) is affirmative, one or more "j-th" (ordinal-j) error entries are made into an error storage memory, and/or the presence of at least one ordinal-j malfunction is registered.

The foregoing method is designed to make a vehicle operate more reliably, to detect and/or avoid control—and/or operating errors in a vehicle, and/or to operate a vehicle, particularly of a kind that is equipped with the aforementioned "electronic clutch management" system. The method is based on the principle of setting a target characteristic of an actuator and then measuring or determining the actually occurring behavior. If discrepancies of a certain magnitude are detected between corresponding parameters of the target characteristic and the actual behavior, the occurrence of a malfunction is entered in an error storage memory and/or the presence of an error is registered.

The invention is distinguished in that a finer differentiation is made when an error occurs, in contrast to the existing state of the art, where only one kind of error is registered.

For example, an error entry is made (and/or the actuator is deactivated) according to the invention not only if the actuator fails to move (where the time gradient of the actuator displacement is essentially zero), but also if a certain amount of discrepancy exists between the targeted time gradient and the actually occurring time gradient of the actuator displacement. Preferably, a differentiation is made between a case where the targeted displacement gradient is significantly larger than the actually occurring displacement gradient and another case where the actually occurring displacement gradient is zero.

The differentiation between different degrees of target-versus-actual discrepancies allows a more detailed evaluation of malfunctions in a vehicle with a clutch device than prior-art methods. For example, the invention provides the possibility of indicating an undesirable hydraulic throttling resistance or increased friction in the actuator, e.g., if the actually occurring displacement gradient is significantly smaller than the targeted gradient. If there is no movement (displacement gradient) even with an overload on the actuator, this would indicate that the actuator is blocked or jammed.

The inventive method of the foregoing description is used to particular advantage with an actuator of a torque-transmitting device such as a clutch.

With particular preference, the actuator device in the context of the present invention is based on a kinetic principle (as compared to, e.g., an electrical principle). A typical example is a hydraulic actuator device with at least one master cylinder containing a master-cylinder piston with a master-cylinder piston rod as well as a slave cylinder containing a slave-cylinder piston with a slave-cylinder piston rod. A hydraulic conduit connects between port openings of the cylinders at the ends that face away from the piston rods. The system constituted by the cylinders and the conduit preferably contains a hydraulic fluid at least part of the time. The master cylinder according to a preferred embodiment of the invention further has a sniffle bore that connects to a container holding fluid under at a pressure that is essentially independent of the fill level of the container. This arrangement of a container and a sniffle bore serves in particular to maintain a constant fill level, pressure and composition of the hydraulic fluid in the system.

In preferred embodiments of the invention, the slave-cylinder piston rod is connected to and acts on an actuator device for actuating the clutch.

A device for controlling the master-cylinder piston may include its own actuator or a hydraulic control device. The hydraulic control device can be part of an existing hydraulic circuit of a motor vehicle.

According to a particularly preferred embodiment of the invention, a malfunction is registered and/or an error is entered in a storage memory if at a certain time within a prescribed time window the target displacement deviates from the actually occurring displacement by more than a predetermined maximum allowable displacement deviation.

Further among preferred embodiments of the invention, a malfunction is also registered and/or an error is entered in a storage memory if at a certain time within a prescribed time window the target displacement gradient deviates from the actually occurring displacement gradient by more than a predetermined maximum allowable gradient deviation.

Furthermore, a malfunction can also be registered if at a certain time within a prescribed time window the target displacement deviates from the actually occurring displacement by more than a predetermined maximum allowable displacement deviation while at the same time, the actually occurring displacement gradient is smaller than a predetermined minimum allowable gradient of the actually occurring displacement.

It is particularly preferred if different kinds of malfunctions are differentiated by different entries into the error storage memory.

For example, a first error entry may indicate that the actually occurring displacement gradient was within a certain (non-permissible) range, while a second error entry may indicate, e.g., that the actually occurring displacement gradient was zero.

It is also preferable to set the minimum allowable gradient for the actually occurring displacement at a value greater than zero.

The maximum allowable deviation from a targeted displacement function or from a targeted displacement gradient, or the minimum allowable actual displacement gradient can for example be set as a constant value.

Nevertheless, the scope of preferred embodiments also includes that the maximum allowable deviation from a targeted displacement function or from a targeted displacement gradient, or the minimum allowable actual displacement gradient is given in the form of a function that depends, e.g., on the given targeted displacement function.

According to a particularly preferred embodiment of the invention, a targeted increase or decrease of the displacement is given, and the time interval is measured that a reference component of the actuator takes to match the targeted increase or decrease in displacement. Based on a characteristic correlation between displacements and allowable time intervals, a determination is made whether a malfunction has occurred and if so, what kind of malfunction.

It is further preferred to differentiate between two ways of measuring the time taken to accomplish a targeted increase or decrease in displacement. For example, a first way is to measure the time that it takes for a reference component of the actuator to travel a predetermined distance.

Another possibility is to measure the time it takes for the reference component to settle into a prescribed target position. This would be the case, if the reference component approaches the target position through a transient oscillation, overshooting the target at first and changing direction back and forth while zeroing in on the target position. Combinations of the two ways of measuring the time for the change in actuator position are also conceivable under the present invention.

It is among the preferred concepts of the invention to use prescribed model functions of a displacement-versus-time characteristic for diagnostic purposes in a repair shop. With particular preference, the diagnostic model functions are specially tailored to check a vehicle for specific malfunctions.

It is further preferred to measure and evaluate the differences between actual and targeted displacement and/or between actual and targeted displacement gradient during the normal operation of the vehicle. This allows a malfunction to be indicated or corrected while the vehicle is in operation.

In situations where a malfunction has been registered or an error has been entered in the error memory, a preferred embodiment of the inventive method provides that the actuator be switched off. A further preferred measure in such situations is to make corrections to the targeted displacement-versus-time function.

According to a particularly preferred embodiment of the invention, a specifically designed function for evaluating the dynamic system behavior is prescribed as the targeted displacement-versus-time function.

In a particularly preferred embodiment of the invention, a plurality of different displacement-versus-time functions are given as control targets, and the resulting actual displacement behaviors are measured. Based on combinations of different responses to different target inputs, it is possible to draw additional diagnostic conclusions.

Examples of target input functions according to the invention include a substantially slow displacement-versus-time function and also, with particular preference, a substantially fast displacement-versus-time function.

It is particularly preferred to set a fast and then a slow displacement-versus-time function following each other as input targets. This sequence of input targets could be used, e.g., for the following evaluation: If an error was registered only with a substantially fast displacement-versus-time target input, and no error was registered with a substantially slow displacement-versus-time target input, this would indicate an undesirable throttling resistance in the hydraulic system.

As another example, if an error is registered with both fast and slow displacement-versus-time target profiles, this would allow the conclusion that an undesirable friction effect is present.

The object of the invention is further met by a motor vehicle that is equipped with at least one control device and at least one data storage device, wherein under predetermined situations data are transferred from the control device to the data storage device or vice versa. At least parts of some of the data can be stored in the data storage device in more than copy, for example in triplicate. An exemplary vehicle of this kind can be equipped with a control device to carry out the inventive method in any of its various forms as disclosed in the foregoing description.

It should be noted that in cases where features are connected herein by the word "or", this can be meant in the sense of a logic OR (one or the other or both) or as an exclusive "or" (one or the other, but not both), depending on the context.

Further, the words "control" and "regulation" as well as their various derivatives are intended herein to encompass a broad range of meanings, including in particular all kinds of closed-loop and open-loop regulation and control systems and methods in the sense of the applicable DIN standards.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The following detailed description of the invention is based on the attached drawing in which.

DETAILED DESCRIPTION OF THE INVENTION

Figure 1:
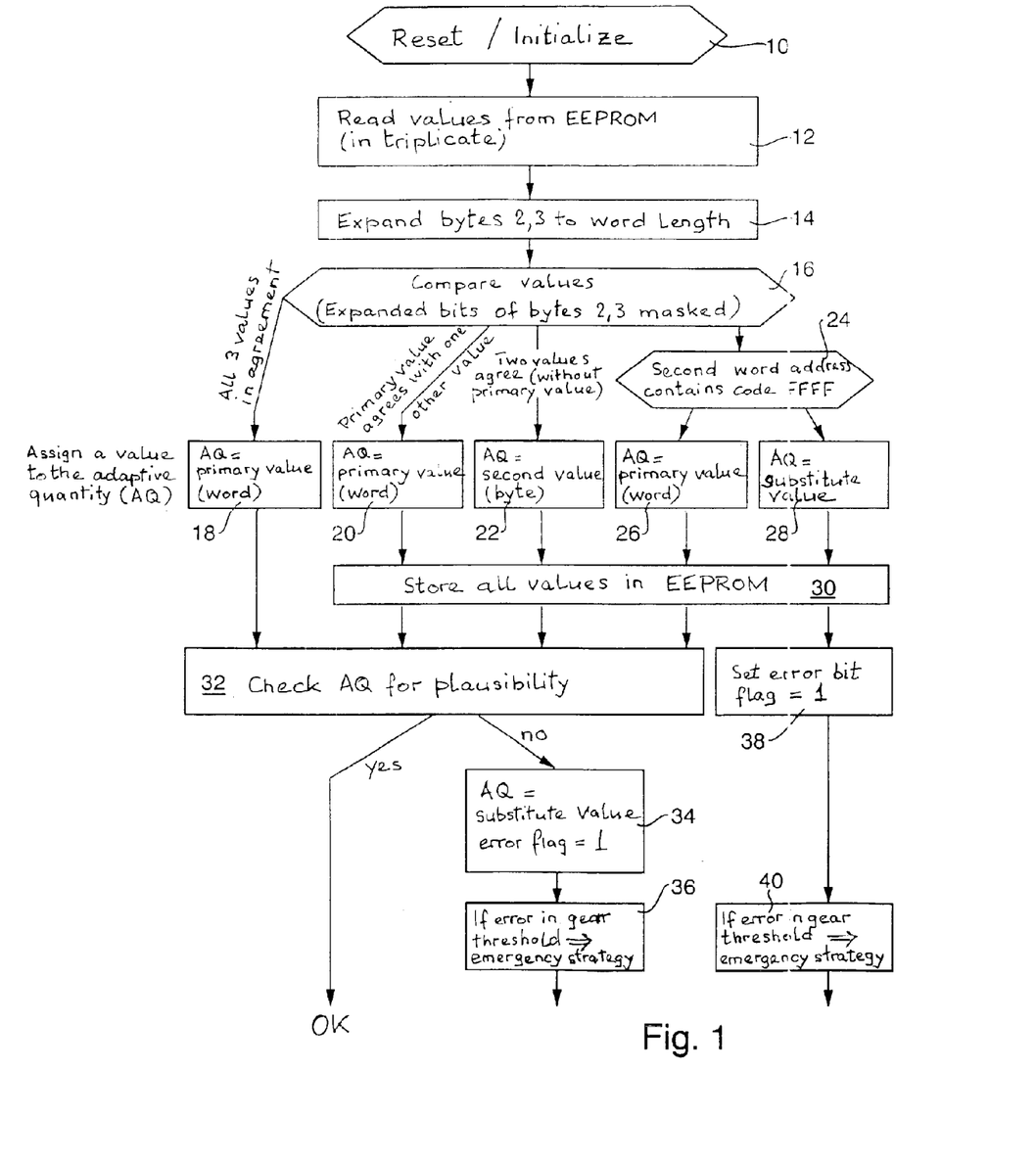
FIG. 1 represents an exemplary embodiment of the method according to the invention in flow-chart format.

FIG. 1 illustrates an exemplary embodiment of the method according to the invention in flow-chart format.

In particular, the flow-chart shows those method steps that are performed to retrieve data that have been stored in multiple copies from storage memory back into the control device or specifically into the y-controller.

In step 10, the control device is reset and initialized. Next, the three values that are stored in memory for each adaptive quantity, i.e., a primary storage value and two redundant storage entries, are read back in step 12 from the EEPROM.

In step 14, the two redundant storage entries, which are stored at different addresses as one byte each, are expanded to word format.

In step 16, the second and third storage entries are fitted to masks and compared to each other and/or to the primary storage value.

If the three values being compared (also referred to herein as comparison values) are identical, the value of the primary storage entry is tentatively assigned to the adaptive quantity (step 18). If the primary storage value and one of the redundant values are the same but the other of the redundant values is different, the primary storage value is tentatively assigned to the adaptive quantity (step 20). If the two redundant values agree but the primary value is different, the first redundant value is tentatively assigned to the adaptive quantity (step 22).

If all of the three storage entries are different from each other, a differentiation is made according to step 24, as follows: If the second entry (i.e., the first redundant entry) contains an error code, the primary storage value is tentatively assigned to the adaptive quantity (step 26). If the second entry contains no error code, a substitute value is assigned to the adaptive quantity (step 28). The value that was assigned to the adaptive quantity in one of the steps 20, 22, 26, or 28 is entered into the storage device (EEPROM) in place of the nonconforming previous data (step 30). Next, in step 32, the value tentatively assigned to the adaptive quantity in one of the steps 18, 20, 22, 26 is checked for plausibility.

If a substitute value was assigned to the adaptive quantity (step 38), a bit flag is set in the error storage memory. If the error was found to lie in the gear-shifting threshold values, an emergency driving strategy is initiated (step 40).

If all of the values going through step 32 have been found plausible, the illustrated subroutine is essentially completed and the vehicle is operational with the retrieved and checked values of the adaptive constants. However, if a value of an adaptive quantity is found implausible in step 32, a substitute value is assigned and a bit flag is set in the error storage memory (step 34). If the error was found to lie in the gear-shifting threshold values, an emergency driving strategy is initiated (step 36).

Figure 2:
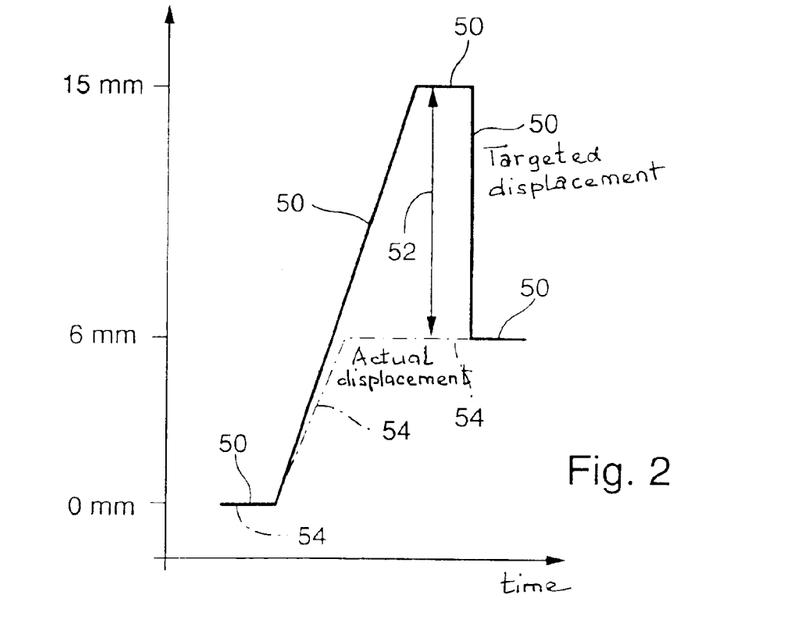
FIG. 2 represents a first example of a system malfunction that can be detected by the inventive method based on a discrepancy between a given control target and the actually occurring behavior of the system.

FIG. 2 illustrates a first example of a system malfunction that can be detected by the inventive method based on a discrepancy between a given control target and the actually occurring behavior of the system.

An actuator movement from 0 to 15 mm within a set time is given as a target profile 50. The actually occurring actuator displacement (54) closely follows the target profile up to a displacement of 6 mm, where it abruptly stops and remains at a constant position. As there is now a discrepancy between the targeted and the actually occurring displacement, as indicated by the double-ended arrow 52, the target profile is adjusted to match the actually occurring displacement. This measure is appropriate to protect the system from further damage. However, the protective measure alone does not provide an error detection unless further steps are taken.

The detection and evaluation of the malfunction requires registering the fact that the time gradient of the actually occurring displacement profile 54 agrees substantially with the gradient of the target profile 50, while the profiles themselves are in significant disagreement. The parameters defining this behavior can be used to evaluate the malfunction.

Figure 3:
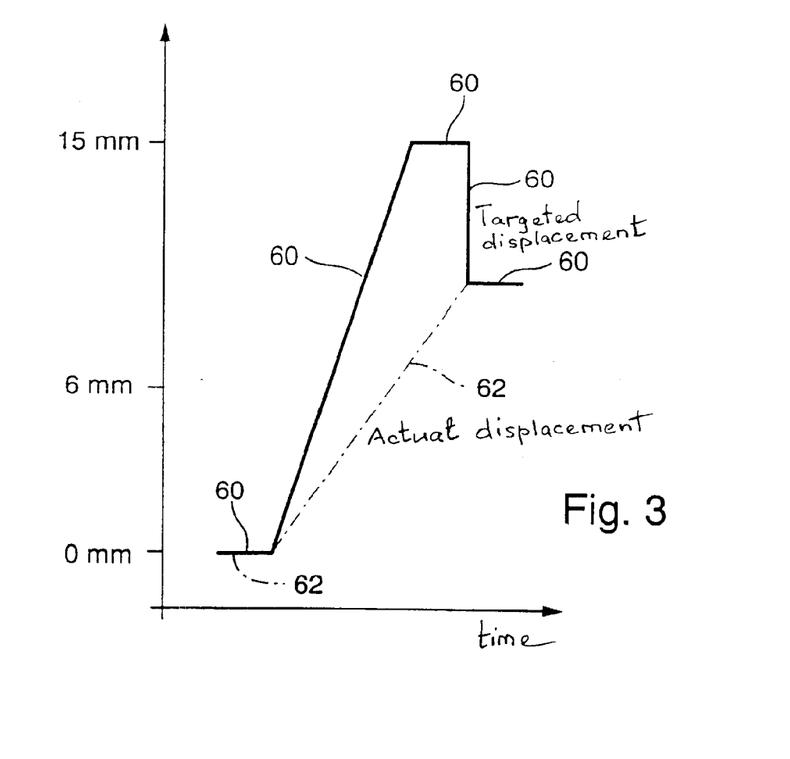
FIG. 3 represents a second example of a system malfunction that can be detected by the inventive method based on a discrepancy between a given control target and the actually occurring behavior of the system.

FIG. 3 illustrates a second example of a discrepancy between a given control target and the actually occurring behavior of the system, which is indicative of a malfunction in the overall system.

The target profile represents again an actuator movement from the zero position to a displacement of 15 mm, while the actually occurring displacement only reaches a position between 6 and 15 mm.

The discrepancy between the actual behavior and the target profile in the example of FIG. 3 is not as large as in the case of FIG. 2.

Nevertheless, there is a significant difference in the slope gradient 60 of the target profile and the gradient 60 of the actual displacement profile. The system uses the gradient data in an evaluation routine. The significant discrepancy between the gradients is indicative of a malfunction.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of operating a motor vehicle with an electronically controlled automatic clutch device, at least one control device, and at least one data storage device for storing information comprising data values of operating quantities, data values of operating parameters, data values of adaptive parameters, and check values, wherein at least one of said data values is subjected to the steps of:

a) storing the data value as a storage value in the data storage device;

b) storing at least one check value for the data value as a storage value in the data storage device;

wherein the at least one check value serves to verify whether the data value was entered correctly, and wherein a predetermined checking characteristic is used for said verification, wherein step a) comprises reading the data value from the control device and wherein step a) comprises storing the data value at least twice so that as a result, the data value is represented in the storage device by a primary storage value and by at least one redundant storage value.

2. The method of claim 1, wherein at least a part of the data values are values of operating parameters used for controlling the motor vehicle.

3. The method of claim 1, wherein step a) comprises reading the data value from the control device.

4. The method of claim 1, wherein the primary storage value and the at least one redundant storage value have different data formats.

5. The method of claim 1, wherein at least one of the primary storage value and the at least one redundant storage value has a data format based on binary bits.

6. The method of claim 5, wherein the data format is an 8-bit format.

7. The method of claim 5, wherein the data format is a 16-bit format.

8. The method of claim 5, wherein said data value has a first format with a length of N bits and storing comprises shifting the data value by a number v of bit positions according to a prescribed shifting characteristic to represent at least part of the data value in a second format shorter than N bits.

9. The method of claim 8, wherein the number v is determined on the basis of at least one of the criteria consisting of the required level of numerical precision at which the data value is to be stored, and the range of possible values that the data value can take on.

10. The method of claim 8, wherein v=2 and the data value characterizes one of a neutral position of a transmission, a shift-lever position within at least one leg of a shift pattern, at least one rest position of a clutch, and at least one friction coefficient of the clutch.

11. The method of claim 8, wherein v=3 and the data value characterizes a point of engagement of a clutch.

12. The method of claim 5, wherein the storage device comprises addresses arranged in an ordered sequence and a predetermined default code is entered into at least one of said addresses prior to storing the data value, said default code serving as an indicator that no data value has yet been correctly entered into the at least one of said addresses, and wherein the predetermined default code has one of the forms "FFFF", "11111111", and "1111111111111111".

13. The method of claim 12, wherein the at least one of said addresses is designated to receive a redundant storage value, the predetermined default code is entered into the at least one of said addresses prior to storing the redundant storage value as an indicator that no redundant storage value has yet been correctly entered into the at least one of said addresses, and the predetermined default code has one of the forms "FFFF" and "1111111111111111".

14. The method of claim 12, wherein further the predetermined default code is overwritten with the data value at a predetermined point in time.

15. The method of claim 12, wherein the data value is stored sequentially, first as the primary storage value and subsequently as the at least one redundant storage value.

16. The method of claim 12, wherein the at least one check value comprises at least one of a test number and a test code, wherein said at least one test number/code is determined according to a predetermined test-number/code characteristic at any time within an interval ranging from before to after step a), and wherein step b) is performed in sequence after step a).

17. The method of claim 16, wherein step b) comprises storing the at least one test number/code at the same address as the data value.

18. The method of claim 16, wherein step b) comprises storing the at least one test number/code at a different address from the data value.

19. The method of claim 16, wherein the test number/code is correlated with at least one of the data value, the storage address of the data value, and a partial storage address of the data value according to a test number/code correlation characteristic.

20. The method of claim 16, wherein at least one of the storage values in the storage device has at least one test number/code assigned to it, and wherein the method further comprises the step of checking whether the at least one test code/number confirms said at least one of the storage values.

21. The method of claim 20, wherein at least one of the storage values is the data value of a working parameter.

22. The method of claim 20, wherein at least one of the storage values represents at least one of a primary storage value and a redundant storage value.

23. The method of claim 20, further comprising the step of selecting at least one of the storage values according to a prescribed selection characteristic, wherein the selected value is used as an at least preliminary working value for at least one working variable and the prescribed selection characteristic comprises the condition that the at least one test number/code confirm said at least one of the storage values.

24. The method of claim 20, further comprising the step of selecting a substitute value according to a substitute-value characteristic for the at least one of the storage values if the latter is not confirmed by the test number/code, wherein the substitute value is used as an at least preliminary working value for at least one working variable.

25. The method of claim 20, further comprising the step of selecting a substitute value according to a substitute-value characteristic for the at least one of the storage values, if it cannot be assured with at least a prescribed level of probability that the at least one of the storage values is identical with the data value that was read from the control device into the storage device in step a).

26. The method of claim 1, wherein the storage device comprises addresses and wherein step a) comprises using m bits of an n-bit address for storing at least part of at least one of the primary storage value and the at least one redundant storage value.

27. The method of claim 26, wherein n=16 and m=8.

28. The method of claim 26, wherein step a) comprises storing at least a part of the primary storage value and at least a part of the at least one redundant storage value at the same of said addresses.

29. The method of claim 26, wherein the addresses comprise words of 16 bits, each of said words being subdivided into a first byte of 8 bits and a second byte of 8 bits, and wherein of the primary storage value and the at least one redundant storage value at least a part of one is stored in the first byte and at least part of the other is stored in the second byte.

30. The method of claim 1, wherein the storage device comprises addresses arranged in an ordered sequence and the at least one redundant storage value comprises a plurality of storage values stored at consecutive addresses.

31. The method of claim 1, wherein the control device is reset at prescribed points in time.

32. The method of claim 31, wherein the resetting takes place when the control device receives one of an "ignition on" signal and a "wake up" signal.

33. A method of operating a motor vehicle with an electronically controlled automatic clutch device, at least one control device, and at least one data storage device for storing information comprising data values of operating quantities, data values of operating parameters, data values of adaptive parameters, and check values, wherein at least one of said data values is subjected to the steps of:
   a) storing the data value as a storage value in the data storage device;
   b) storing at least one check value for the data value as a storage value in the data storage device;
   wherein the at least one check value serves to verify whether the data value was entered correctly, and wherein a predetermined checking characteristic is used for said verification, wherein the data storage device is one of a device comprising at least one EEPROM and a device comprised in at least one EEPROM.

34. The method of claim 33, wherein the EEPROM is structured into 16-bit words and is selected from the group consisting of a 64-word EEPROM, a 128-word EEPROM, and a 256-word EEPROM.

35. The method of claim 33, wherein at least part of the addresses of the EEPROM are assigned to serve as error-storage memory.

36. The method of claim 33, wherein at least part of the addresses of the EEPROM are assigned to serve as storage memory for data values that remain substantially constant.

37. The method of claim 33, wherein at least a part of the addresses of the EEPROM are assigned to receive data values belonging to adaptive parameters.

38. The method of claim 37, wherein the vehicle has an ignition switch, the control device performs a shut-down phase after turning off the ignition switch, and wherein data values belonging to the adaptive parameters are stored at least in duplicate during the shut-down phase.

39. The method of claim 38, wherein the information further comprises additional data values that meet at least one of the characteristics of staying constant during operating phases of the vehicle and of serving a purpose other than controlling the vehicle, and step a) comprises storing said additional data values at a time that is substantially independent of turning off the ignition switch.

40. The method of claim 39, wherein step a) further comprises storing at least a part of the additional values in at least one of an array and a dual array.

41. The method of claim 39, wherein at least a part of the additional values are correlated with at least one adaptive parameter.

42. The method of claim 39, wherein the information further comprises at least one substitute value for an adaptive parameter, said substitute value being predetermined so that the vehicle can be operated with the substitute value instead of the adaptive value, and step a) comprises storing said substitute value at a time that is substantially independent of turning off the ignition switch.

43. The method of claim 39, wherein the information further comprises at least one reference value and step a) comprises storing said reference value at a time that is substantially independent of turning off the ignition switch.

44. The method of claim 39, wherein the information further comprises at least one constraining value for an adaptive parameter, said constraining value representing one of a single allowable value for the adaptive parameter and a range limit for allowable values of the adaptive parameter, and step a) comprises storing said constraining value at a time that is substantially independent of turning off the ignition switch.

45. The method of claim 39, wherein the information further comprises at least one tuning-parameter value, and step a) comprises storing said tuning-parameter value at a time that is substantially independent of turning off the ignition switch.

46. The method of claim 39, wherein the information further comprises at least one calibration value, and step a) comprises storing said calibration value at a time that is substantially independent of turning off the ignition switch.

47. The method of claim 39, wherein the information further comprises at least one first masking characteristic for masking at least one bit position of the data value, and step a) comprises storing said first masking characteristic at a time that is substantially independent of turning off the ignition switch.

48. The method of claim 39, wherein the information further comprises at least one first shifting characteristic for shifting the storage value by at least one bit position at the time of storing, and step a) comprises storing said first shifting characteristic at a time that is substantially independent of turning off the ignition switch.

49. The method of claim 48, further comprising the step of reading back at least part of the storage values for at least one adaptive parameter at predetermined points in time.

50. The method of claim 49, wherein the value being read back is subjected to masking at least part of the read-back value at the time of reading back.

51. The method of claim 49, wherein at the time of storing a redundant storage value at least one bit is dropped from said redundant storage value, and at the time of reading back, said dropped bit is restored to said redundant value based on at least one given value.

52. The method of claim 51, wherein the at least one given value is the primary storage value.

53. The method of claim 49, wherein the at least one redundant storage value comprises at least two redundant storage values from the group of transformed values and masked values, and wherein the method further comprises the step of:
    comparing the at least two redundant storage values to each other.

54. The method of claim 49, wherein the primary storage value is stored in word format and the at least one redundant storage value is stored in byte format, and wherein the method further comprises the step of:
    comparing at least a portion of the primary storage value with at least a portion of the at least one redundant storage value.

55. The method of claim 49, wherein the at least one redundant storage value comprises a plurality of redundant storage values, and wherein the method further comprises the step of:
    comparing at least a portion of one of said plurality to at least a portion of another of said plurality of redundant storage values.

56. The method of claim 49, wherein the at least one redundant storage value comprises at least one of a transformed value and a masked value, and wherein the method further comprises the step of:
    comparing the primary storage value with at least one of the transformed value and the masked value.

57. The method of claim 49, further comprising at least one of the steps of:
    comparing at least a portion of the primary storage value with at least a portion of at least one redundant storage value; and
    comparing the redundant values to each other.

58. The method of claim 57, further comprising the step of selecting one of the primary storage value and the at least one redundant storage value according to a prescribed selection characteristic, wherein the selected value is used as an at least preliminary working value for at least one working variable.

59. The method of claim 58, wherein the prescribed selection characteristic comprises a comparison between the primary storage value and the at least one redundant storage value.

60. The method of claim 59, wherein said selection characteristic further comprises a selection criterion whereby one of the primary storage value and the at least one redundant storage value is eligible for selection if at least two of the values being compared deviate from each other by less than a prescribed maximum allowable discrepancy.

61. The method of claim 60, wherein the maximum allowable discrepancy is a constant.

62. The method of claim 61, wherein the functional relationship correlates the maximum allowable discrepancy to the absolute magnitude of the values being compared.

63. The method of claim 60, wherein the maximum allowable discrepancy is prescribed as a functional relationship.

64. The method of claim 59, wherein said selection characteristics further comprises a selection criterion whereby one of the primary storage value and the at least one redundant storage value is selected if at least two of the values being compared are substantially identical.

65. The method of claim 59, wherein said selection characteristic further comprises a selection criterion whereby one of the primary storage value and the at least one redundant storage value is selected if it occurs with the highest frequency among the values being compared.

66. The method of claim 59, wherein said at least one redundant storage value comprises two redundant storage values, and said selection characteristic further comprises a selection criterion whereby, if two values being compared are substantially identical and the third of the values being compared deviates from said two values, one of said two values is selected.

67. The method of claim 59, wherein said at least one redundant storage value comprises two redundant storage values, and said selection characteristic further comprises a selection criterion whereby the primary storage value is selected if the latter is substantially identical to one of the two redundant storage values.

68. The method of claim 59, wherein the primary storage value is selected if at least one other value being compared is an error-code value.

69. The method of claim 68, wherein the error-code value indicates that an electric power supply of the storage device was interrupted at least part of the time while said at least one other value was being stored.

70. The method of claim 59, wherein said selection characteristic further comprises a selection criterion whereby one of the primary storage value and the at least one redundant storage value is selected if said value lies within a strip of a prescribed band where the greatest number of the values being compared are located; said strip being one of a multitude of strips of equal width that can be laid within the prescribed band so that each strip contains at least one of the values being compared and, besides said at least one, as many other values as possible.

71. The method of claim 59, further comprising the step of selecting a substitute value as an at least preliminary working value for at least one working variable according to a prescribed selection characteristic if, according to a prescribed test characteristic, none of the values being compared are suitable to be used as said at least preliminary working value.

72. The method of claim 71, wherein the prescribed test characteristic dictates that the values being compared are unsuitable if not all of the latter are identical.

73. The method of claim 71, wherein the prescribed test characteristic dictates that the values being compared are unsuitable if the number of non-identical values in the comparison exceeds a predetermined proportion of the total number of values being compared.

74. The method of claim 71, wherein the prescribed test characteristic dictates that the values being compared are unsuitable if all of the values being compared are different from each other.

75. The method of claim 71, wherein the prescribed test characteristic dictates that the values being compared are unsuitable if all of the values being compared are different from each other and none of the values being compared contains an error code.

76. The method of claim 71, wherein the prescribed test characteristic dictates that the values being compared are unsuitable if at least one of the values being compared contains an error code.

77. The method of claim 71, further comprising the step of setting at least one substitute value according to a substitute-value characteristic.

78. The method of claim 77, wherein the substitute-value characteristic comprises a functional dependency of the substitute value on at least one of the values being compared.

79. The method of claim 77, wherein the substitute-value characteristic dictates that one of the values being compared be set as the substitute value if said comparison value lies within a strip of a prescribed band where the greatest number of the values being compared are located; said strip being one of a multitude of strips of equal width that can be laid within the prescribed band so that each strip contains at least one of the values being compared and, besides said at least one, as many other values as possible.

80. The method of claim 71, further comprising the step of setting at least one substitute value by reading the substitute value from a substitute-value storage memory, wherein the at least one stored substitute value was set at an appropriate magnitude to keep the vehicle operable.

81. The method of claim 80, wherein the redundant storage values are referred to by an ordinal number i, and wherein the primary storage value and the redundant value of an order i, are stored outside of the substitute-value storage memory.

82. The method of claim 81, wherein the substitute-value storage memory comprises a substitute-value correlation characteristic defining a correlation between at least one substitute value and at least one working parameter.

83. The method of claim 71, wherein the prescribed test characteristic dictates that the values being compared are unsuitable if at least one of the latter contains an error code.

84. The method of claim 53, wherein said data values comprise gear-shifting threshold values, and wherein the method further comprises the step of selecting an emergency driving strategy after an error in said gear-shifting threshold values has been detected.

85. The method of claim 84, comprising the step of selecting an implausible substitute value for a gear-shifting threshold value if at least a predetermined number of the storage values being compared for the gear-shifting threshold value are different from each other.

86. The method of claim 84, comprising the step of selecting an implausible substitute value for a gear-shifting threshold value if all of the storage values being compared for the gear-shifting threshold value are different from each other.

87. The method of claim 58, further comprising the step of transferring the at least preliminary working value to the control device.

88. The method of claim 58, further comprising the step of performing a plausibility check on at least one of the primary storage value, the at least one redundant storage value, the at least one transformed redundant storage value, the at least one masked redundant storage value, a comparison value, the selected value, and a preliminary selected value.

89. The method of claim 88, wherein the plausibility check comprises a determination whether a value being checked lies within a prescribed allowable range of values.

90. The method of claim 89, further comprising the step of setting an upper range limit and a lower range limit for said allowable range, wherein said upper and lower range limits are matched to the control device in such a manner that adaptations of parameters performed by the control device during operation of the vehicle will not cause the adapted parameters to take on values outside a permissible range.

91. The method of claim 88, further comprising the step of selecting a substitute value according to a substitute-value characteristic for the plausibility-checked value if the latter has been found implausible.

92. The method of claim 88 wherein, if the plausibility-checked value represents a gear-shifting threshold value and has been found implausible, said implausible value is kept as the gear-shifting threshold value.

93. The method of claim 88 wherein, if at least one of the plausibility-checked values has been found plausible, said plausible value is selected to be used as an at least preliminary working value and, if at least one of the plausibility-checked values has been found implausible, said implausible value is disregarded.

94. The method of claim 49, wherein the value being read back is subjected to a shift by at least one bit position according to a predetermined second shifting characteristic.

95. The method of claim 94, wherein the second shifting characteristic is substantially the reverse of the first shifting characteristic.

96. The method of claim 49, wherein said at least one of the data values is stored in a first data format and is converted to a second data format upon reading back.

97. The method of claim 96, wherein the first data format is a byte format and the second data format is a word format.

98. The method of claim 97, wherein the at least one of the storage values is a redundant value.

99. A motor vehicle comprising at least one control device and at least one data storage device, wherein under first predetermined situations data are transmitted from the control device to the data storage device and under second predetermined situations data are transmitted from the data storage device to the control device, and wherein at least a part of said data are stored in at least duplicate form in the data storage device.

100. A method of operating a motor vehicle with an electronically controlled automatic clutch device, at least one control device, and at least one data storage device for storing information comprising data values of operating quantities, data values of operating parameters, data values of adaptive parameters, and check values, wherein at least one of said data values is subjected to the steps of:
  a) storing the data value as a storage value in the data storage device;
  b) storing at least one check value for the data value as a storage value in the data storage device;
  wherein the at least one check value serves to verify whether the data value was entered correctly, and wherein a predetermined checking characteristic is used for said verification, wherein the predefined error manifests itself through at least one of the error system consisting of:
    a discrepancy between storage values representing one and the same data value;
    the presence of a default code in at least one of the storage values representing said data value;
    a finding that all of the storage values representing said data value are different and that a substitute value was selected for said data value; and
    a finding that none of the storage values representing said data value were found to be plausible in a plausibility check.

101. A method of operating a motor vehicle with an electronically controlled automatic clutch device, at least one control device, and at least one data storage device for storing information comprising data values of operating quantities, data values of operating parameters, data values of adaptive parameters, and check values, wherein at least one of said data values is subjected to the steps of:
  a) storing the data value as a storage value in the data storage device;
  b) storing at least one check value for the data value as a storage value in the data storage device;
  wherein the at least one check value serves to verify whether the data value was entered correctly, and wherein a predetermined checking characteristic is used for said verification, further comprising the step of setting at least one error code, if at least one predefined error has been detected.

102. The method of claim 101, further comprising the step of storing at least one of a corrected value and a selected value to represent said data value, if the at least one error code was set for said data value.

103. The method claim 101, wherein the storage device comprises an error-storage memory and an error entry is made into said error-storage memory if the at least one error code was set.

104. The method of claim 103, wherein the at least one error code that was set indicates a finding that all of the storage values representing said data value are different and that a substitute value was selected for said data value.

105. The method of claim 103, wherein the at least one error code that was set indicates a finding that none of the storage values representing said data value were found plausible in a plausibility check.

106. A method of making the operation of a motor vehicle more reliable, comprising:
  a) prescribing a targeted displacement-versus-time function for a movement of an actuator of a torque-transmitting device, said targeted displacement-versus-time function being characterized by at least one target value to be met by at least one predetermined parameter of said function on at least one predetermined time;
  b) issuing a command signal for the actuator to perform a movement according to the targeted displacement-versus-time function of step a) and thereby causing the actuator to move according to an actual displacement-versus-time function characterized by at least one actual value which the at least one predetermined parameter assumes at the predetermined time;
  c) comparing the at least one actual value to the at least one target value;
  d) determining whether the at least one actual value deviates from the at least one target value to an extent that meets a first set of characteristic error criteria;
  e) if the result of step d) is affirmative, performing at least one of the steps of transmitting one first error entry to a storage memory for error entries and registering the presence of at least one first malfunction;
  f) determining whether the at least one actual value deviates from the at least one target value to an extent that meets a higher-order set of characteristic error criteria, said higher order being characterized by an ordinal number of j≧2; and
  g) if the result of step f) is affirmative, performing at least one of the steps of transmitting at least one ordinal-j error entry to a storage memory for error entries and registering the presence of at least one ordinal-j malfunction.

107. The method of claim 106, wherein the actuator comprises at least one kinetic device.

108. The method of claim 106, wherein the actuator comprises at least one hydraulic device.

109. The method of claim 106, wherein the actuator comprises:

at least one master cylinder containing a master-cylinder piston with a master-cylinder piston rod;

at least one slave cylinder containing a slave-cylinder piston with a slave-cylinder piston rod;

at least one hydraulic conduit connecting the master cylinder with the slave cylinder;

at least one motion-transferring device arranged between the slave cylinder piston rod and the torque-transmitting device; and at least one actuator-control device for controlling at least one of the master cylinder piston and the master cylinder piston rod.

110. The method of claim 109, wherein the actuator control device comprises at least one driver device for moving the master cylinder piston.

111. The method of claim 109, wherein the actuator control device comprises an at least partially hydraulic control device.

112. The method of claim 111, wherein the at least partially hydraulic control device comprises at least a part of a hydraulic circuit of the motor vehicle.

113. The method of claim 106, wherein the first set of characteristic error criteria comprises that the targeted displacement-versus-time function deviates from the actual displacement-versus-time function by more than a predetermined maximum allowable displacement deviation.

114. The method of claim 106, wherein the first set of characteristic error criteria comprises that a target time gradient of the targeted displacement-versus-time function deviates from an actual time gradient of the actual displacement-versus-time function by more than a predetermined maximum allowable displacement-gradient deviation.

115. The method of claim 106, wherein the first set of characteristic error criteria comprises that the targeted displacement-versus-time function deviates from the actual displacement-versus-time function by more than a predetermined maximum allowable displacement deviation while simultaneously an actual time gradient of the actual displacement-versus-time function does not exceed a predetermined minimum allowable time gradient for the actual displacement-versus-time function.

116. The method of claim 115, wherein the predetermined minimum allowable time gradient for the actual displacement-versus-time function equals zero.

117. The method of claim 115, wherein the predetermined minimum allowable time gradient for the actual displacement-versus-time function is more than zero.

118. The method of claim 115, wherein at least one of the maximum allowable displacement deviation and a maximum allowable displacement-gradient deviation and the minimum allowable time gradient for the actual displacement-versus-time function is a prescribed constant value.

119. The method of claim 115, wherein at least one of the maximum allowable displacement deviation, a maximum allowable displacement-gradient deviation, and the minimum allowable time gradient for the actual displacement-versus-time function depends on at least one of a targeted displacement, an actual displacement, a targeted displacement gradient, and an actual displacement gradient.

120. The method of claim 106, further comprising:

setting at least one of a predetermined targeted displacement interval and a predetermined targeted end position;

determining a length of time required for the actuator to complete at least one of traveling the targeted displacement interval and reaching the targeted end position; and determining at least one of a presence and nature of a malfunction based on the length of time and based on a correlation characteristic that correlates the malfunction with the length of time.

121. The method of claim 106, wherein the motor vehicle comprises a position-regulating control loop for the actuator displacement, and the method further comprises:

setting at least one of a predetermined targeted displacement interval and a predetermined targeted end position as a control target;

determining a length of time required for regulating the actuator to conform to the control target; and determining at least one of a presence and nature of a malfunction based on the length of time and based on a correlation characteristic that correlates the malfunction with the length of time.

122. The method of claim 106, wherein the targeted displacement-versus-time function is used for operating the vehicle.

123. The method of claim 106, wherein the targeted displacement-versus-time function is used substantially for diagnosing a condition of the vehicle.

124. The method of claim 106, wherein the method is performed while the vehicle is operating.

125. The method of claim 106, wherein the displacement-versus-time function is used for analyzing a dynamic system behavior.

126. The method of claim 106, wherein said method is performed with a first targeted displacement-versus-time function to obtain first comparison results from step c), wherein further said method is performed a second time with a second targeted displacement-versus-time function to obtain second comparison results from step c), and wherein at least a part of said first and second comparison results are evaluated to generate an overall result for diagnosing a condition of the vehicle.

127. The method of claim 106, wherein the targeted displacement-versus-time function comprises a substantially slow displacement-versus-time function.

128. The method of claim 106, wherein the targeted displacement-versus-time function comprises a substantially fast displacement-versus-time function.

129. The method of claim 126, wherein the first targeted displacement-versus-time function comprises a substantially fast displacement-versus-time function and the second targeted displacement-versus-time function comprises a substantially slow displacement-versus-time function, and wherein further the overall result comprises that an undesirable throttling resistance is present in the hydraulic circuit, if the first comparison result indicates a malfunction and the second comparison result indicates no malfunction.

130. The method of claim 126, wherein the first targeted displacement-versus-time function comprises a substantially fast displacement-versus-time function and the second targeted displacement-versus-time function comprises a substantially slow displacement-versus-time function, and wherein further the overall result comprises that an undesirable friction effect is present, if the first and second comparison results both indicate a malfunction.

* * * * *